(12) United States Patent
Begen et al.

(10) Patent No.: US 9,338,209 B1
(45) Date of Patent: May 10, 2016

(54) USE OF METADATA FOR AIDING ADAPTIVE STREAMING CLIENTS (71) Applicant: CISCO TECHNOLOGY, INC., San Jose, CA (US)

(72) Inventors: Ali C. Begen, London (CA); Scott C. Labrozzi, Cary, NC (US)

(73) Assignee: CISCO TECHNOLOGY, INC., San Jose, CA (US)

(*) Notice: Subject to any disclaimer, the term of this patent is extended or adjusted under 35 U.S.C. 154(b) by 249 days.

(21) Appl. No.: 13/868,595

(22) Filed: Apr. 23, 2013

(51) Int. Cl.
G06F 15/16 (2006.01)
H04L 29/06 (2006.01)
H04N 21/845 (2011.01)
H04N 21/61 (2011.01)

(52) U.S. Cl.
CPC .......... *H04L 65/601* (2013.01); *H04N 21/6125* (2013.01); *H04N 21/8455* (2013.01); *H04N 21/8456* (2013.01)

(58) Field of Classification Search
None
See application file for complete search history.

(56) References Cited

U.S. PATENT DOCUMENTS

| 7,835,406 | B2 | 11/2010 | Oran et al. | |
|---|---|---|---|---|
| 8,806,050 | B2* | 8/2014 | Chen et al. | 709/231 |
| 8,887,020 | B2* | 11/2014 | Shokrollahi | 714/752 |
| 8,918,533 | B2* | 12/2014 | Chen et al. | 709/231 |
| 8,958,375 | B2* | 2/2015 | Watson et al. | 370/329 |
| 2004/0128701 | A1* | 7/2004 | Kaneko et al. | 725/136 |
| 2013/0042015 | A1* | 2/2013 | Begen | H04N 19/46 709/231 |
| 2013/0064283 | A1* | 3/2013 | Sun | H04N 21/2343 375/240.01 |
| 2013/0091251 | A1* | 4/2013 | Walker et al. | 709/219 |
| 2013/0227106 | A1* | 8/2013 | Grinshpun | H04W 4/18 709/223 |
| 2013/0227293 | A1* | 8/2013 | Leddy | H04L 9/32 713/176 |

* cited by examiner

*Primary Examiner* — Thomas Dailey
(74) *Attorney, Agent, or Firm* — Patent Capital Group (57) ABSTRACT A method is provided in one example embodiment and includes receiving media from an input; gathering metadata from a plurality of media stream representations that are provided by the input; creating one or more metadata segments corresponding to the plurality of media stream representations in order to generate a metadata track; and making at least a portion of the metadata track available to a client device, where the portion of the metadata track is provided separate from a manifest file.

20 Claims, 6 Drawing Sheets

USE OF METADATA FOR AIDING ADAPTIVE STREAMING CLIENTS

TECHNICAL FIELD

This disclosure relates in general to the field of communications and, more particularly, to a system, an apparatus, and a method for using metadata in streaming environments.

BACKGROUND

End users have more media and communications choices than ever before. A number of prominent technological trends are currently afoot (e.g., more computing devices, more online video services, higher Internet access speeds), and these trends are changing the media delivery landscape. Separately, these trends are pushing the limits of capacity and, may further degrade the performance of video, where such degradation creates frustration amongst end users, content providers, and service providers. In many instances, the video data sought for delivery may be dropped, fragmented, delayed, or simply unavailable to certain end users.

Adaptive Streaming is a technique used in streaming multimedia over computer networks. While in the past, most video streaming technologies used either file download, progressive download, or custom streaming protocols, most of today's adaptive streaming technologies are based on hypertext transfer protocol (HTTP). These technologies are designed to work efficiently over large distributed HTTP networks such as the Internet.

HTTP-based Adaptive Streaming (HAS) operates by tracking metrics such as a user's bandwidth and CPU capacity, and then selecting an appropriate representation (e.g., bandwidth and resolution) among the available options to stream. Typically, HAS would leverage the use of a constant bitrate (CBR) encoder that can encode a single source video at multiple bitrates and resolutions (e.g., representations). The player client can switch among the different representations depending on available resources. Ideally, the result of these activities is little buffering, fast start times, and good video quality experience for both high-bandwidth and low-bandwidth connections.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving media from an input. The input can be from virtually any suitable source (e.g., a server, a cache, a database, etc.). The method also includes gathering metadata from a plurality of media stream representations that are provided by the input. The media stream representations include any combination of video, audio, multimedia, etc. The method also includes creating one or more metadata segments corresponding to the plurality of media stream representations in order to generate a metadata track. The 'segment' could include any suitable data, content, etc., where the segment can have any suitable encoding bitrate. The method also includes making at least a portion of the metadata track available to a client device, wherein the portion of the metadata track is provided separate from a manifest file.

Example Embodiments

Figure 1:
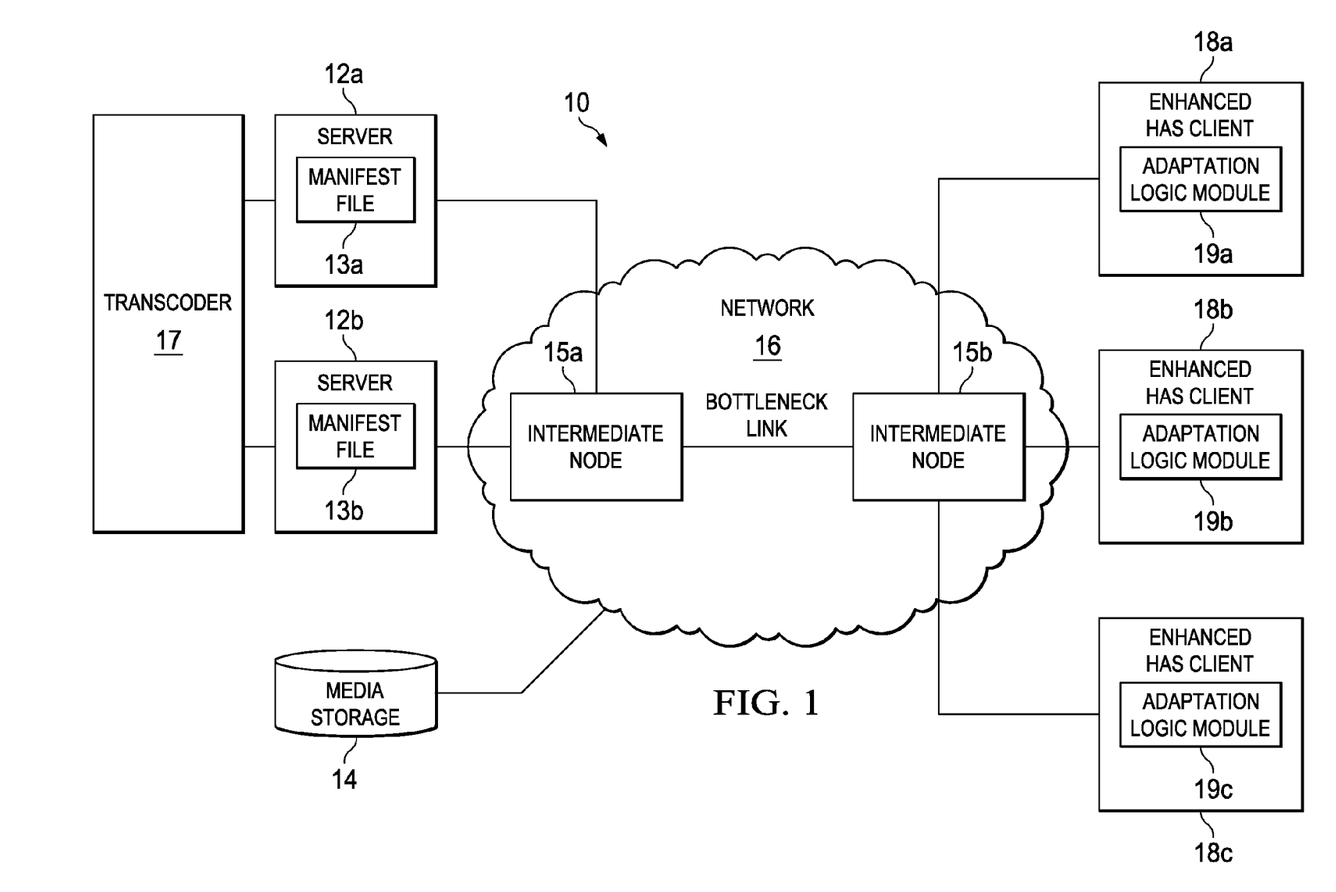
FIG. 1 is a simplified block diagram of a communication system for using metadata to aid in adaptive streaming environments in accordance with one embodiment of the present disclosure.

Turning to FIG. 1, FIG. 1 is a simplified block diagram of a communication system 10 configured for using metadata tracks, for example, in aiding a plurality of clients in accordance with one embodiment of the present disclosure. Communication system 10 may include a plurality of servers 12*a-b*, a media storage 14, a network 16, a transcoder 17, a plurality of enhanced hypertext transfer protocol (HTTP)-based Adaptive Streaming (HAS) clients 18*a-c*, and a plurality of intermediate nodes 15*a-b*. Each HAS client 18*a-c* may include a respective adaptation logic module 19*a-c*. Note that the originating video source may be a transcoder that takes a single encoded source and transcodes it into multiple representations (e.g., bitrates and resolutions), or it could be a "Primary" encoder that takes an original non-encoded video source and directly produces the multiple representations. Therefore, it should be understood that transcoder 17 is representative of any type of multi-rate encoder, transcoder, etc.

Servers 12*a-b* can be configured to deliver requested content to HAS clients 18*a-c*. The content may include any suitable information and/or data that can propagate in the network (e.g., video, audio, media, any type of streaming information, etc.). Each server 12*a-b* may include a respective manifest file 13*a-b*. Certain content may be stored in media storage 14, which can be located anywhere in the network. Media storage 14 may be a part of any Web server, logically connected to one of servers 12*a-b*, suitably accessed using network 16, etc. In general, communication system 10 can be configured to provide downloading and streaming capabilities associated with various data services. Communication system 10 can also offer the ability to manage content for mixed-media offerings, which may combine video, audio, games, applications, channels, and programs into digital media bundles.

In accordance with certain techniques of the present disclosure, the architecture of FIG. 1 can use an additional metadata track to carry a collection of metadata that relates to multiple media segment representations (e.g., video streams). This additional metadata track is to be provided separate from the manifest file and, further, this additional metadata track would otherwise not be available to the clients. Such a framework could allow, for example, additional metadata from multiple media representations to be used to improve streaming capabilities (e.g., constant-quality (CQ) streaming). Additionally, such an architecture could allow the system to achieve enhanced performance without modifying (and subsequently bloating) the client manifest file. Moreover, such a solution can be provided without adding new boxes to media segments or modifying the media segments in a non-backwards-compatible manner: boxes that could result in backwards incompatibility issues, as well as reducing the efficiency of the media segment creation.

Before detailing the metadata track creation in more explicit terms, it is important to understand some of the bandwidth challenges encountered in a network that includes HAS clients. The following foundational information may be viewed as a basis from which the present disclosure may be properly explained. Adaptive streaming video systems make use of multi-rate video encoding and an elastic IP transport protocol suite (typically hypertext transfer protocol/transmission control protocol/Internet protocol (HTTP/TCP/IP), but could include other transports such as HTTP/SPDY/IP, etc.) to deliver high-quality streaming video to a multitude of simultaneous users under widely varying network conditions. These systems are typically employed for "over-the-top" video services, which accommodate varying quality of service over network paths.

In adaptive streaming, the source video is encoded such that the same content is available for streaming at a number of different rates (this can be achieved via either multi-rate coding, such as H.264/AVC, or layered coding, such as H.264 SVC). The video can be divided into "chunks" of one or more group-of-pictures (GOP) (e.g., typically two (2) to ten (10) seconds of length). HAS clients can access chunks stored on servers (or produced in near real-time for live streaming) using a Web paradigm (e.g., HTTP GET operations over a TCP/IP transport), and they depend on the reliability, congestion control, and flow control features of TCP/IP for data delivery. HAS clients can indirectly observe the performance of the fetch operations by monitoring the delivery rate and/or the fill level of their buffers and, further, either upshift to a higher encoding rate to obtain better quality when bandwidth is available, or downshift in order to avoid buffer underruns and the consequent video stalls when available bandwidth decreases, or stay at the same rate if available bandwidth does not change. Compared to inelastic systems such as classic cable TV or broadcast services, adaptive streaming systems use significantly larger amounts of buffering to absorb the effects of varying bandwidth from the network.

In a typical scenario, HAS clients would fetch content from a network server in segments. Each segment can contain a portion of a program, typically comprising a few seconds of program content. [Note that the terms 'segment', 'fragment' and 'chunk' are used interchangeably in this disclosure.] For each portion of the program, there are different segments available with higher and with lower encoding bitrates: segments at the higher encoding rates require more storage and more transmission bandwidth than the segments at the lower encoding rates. HAS clients adapt to changing network conditions by selecting higher or lower encoding rates for each segment requested, requesting segments from the higher encoding rates when more network bandwidth is available (and/or the client buffer is close to full), and requesting segments from the lower encoding rates when less network bandwidth is available (and/or the client buffer is close to empty).

In the case of metadata, providing more information to a plurality of HAS clients is a worthwhile objective. However, where and when to provide that information proves challenging in streaming environments. More generally, adaptive streaming over HTTP has many forms and these forms universally include an instantiation of a manifest file. For example, before the streaming session starts, a streaming client first fetches a file, called the manifest (or its equivalent 'Media Presentation Description' (MPD) in Dynamic Adaptive Streaming over HTTP (DASH) terminology). In the DASH standard, the MPD describes which representations, segments, and sub-segments are available from a given server (or a cache). Certain information regarding representations (e.g., resolution, bitrate, codec, relative quality ranking, etc.) and segments (e.g., duration, addressing scheme) can exist in the manifest file. Further information can be encoded into segment and/or subsegment indexing boxes, where this information helps the client to locate the stream access points (e.g., akin to Instantaneous Decoder Refresh (IDR) frames) in the bitstream for a relatively seamless switching among different representations. These boxes can be prefixed to the fragments, or they can be downloaded separately from the server.

In the DASH framework, each segment is generally a single physical file on the server. In the simplest mode, the encapsulator can create short segments (e.g., two seconds) and then post them as separate files to the server (for access by the client). If constant-bitrate (CBR) encoding is used, segment sizes can be easily computed so that the client understands how many bits it will have to transfer for each request. However, due to CBR encoding, the quality of consecutive segments would likely vary and there is currently no signaling of the quality information (of a segment level) available to the client. In the case of variable-bitrate (VBR) protocols being used, the segment sizes will vary considerably and the client would have no way to know the segment sizes before initiating a request (and then receiving a response from the server).

Alternatively, an entire content piece (e.g., a movie) can be provided as one full segment (i.e., one file) on the server. The encapsulator can produce indices to signal the access point locations to the client. By looking at this information, the client can form the byte-range requests and, by virtue of these byte ranges, the exact size of the fetch is therefore known to the client. But again, the quality information is still not available to the client. Moreover, a constant quality streaming scheme needs certain additional information (referred to as metadata herein) that is not carried inside the manifest file (or indexing boxes). Some systems try to bluntly feed the metadata to the client themselves; however, such a solution is neither efficient nor scalable.

Figure 2:
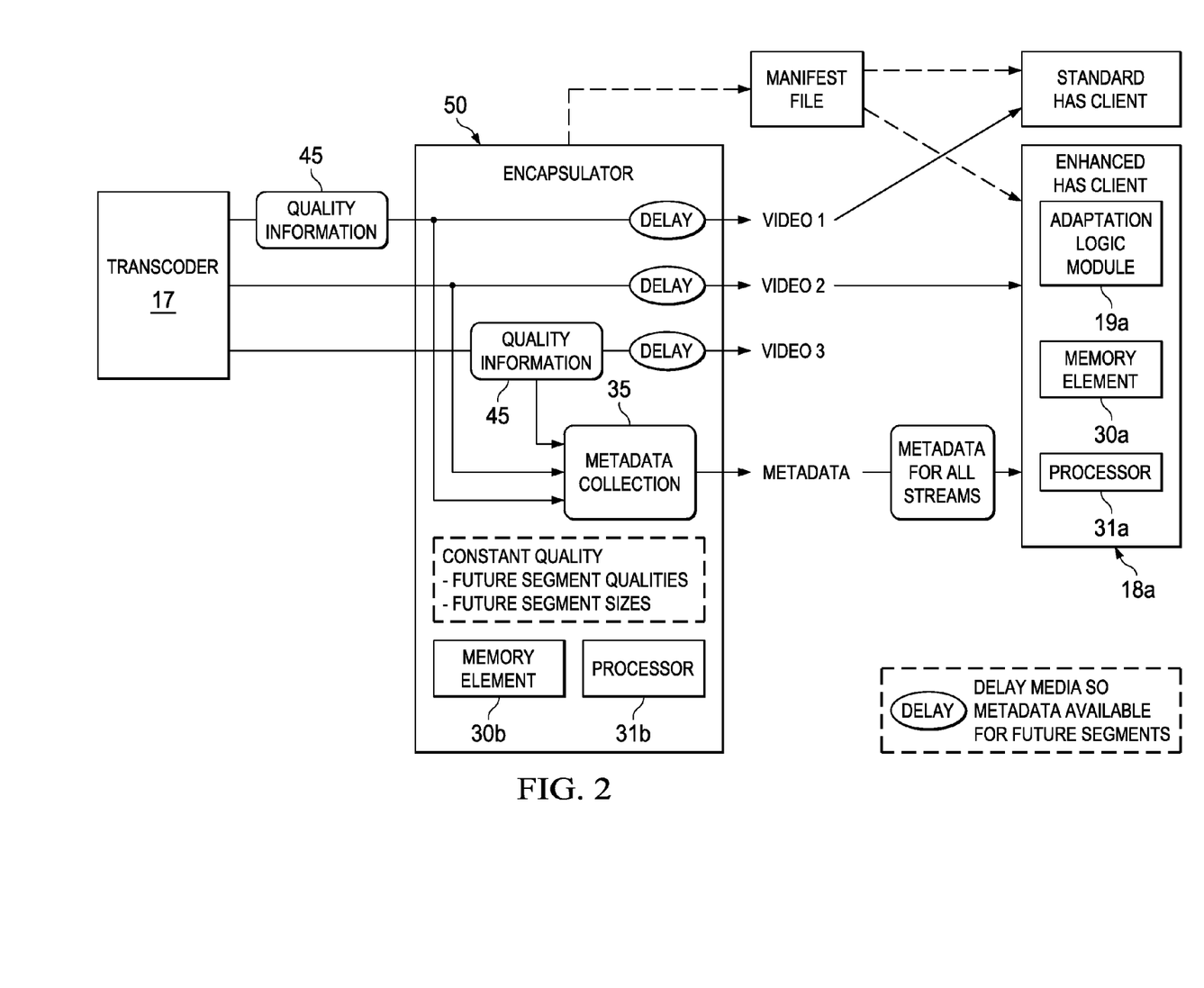
FIG. 2 is a simplified schematic diagram illustrating an example use of metadata for aiding one or more clients in accordance with the present disclosure.

FIG. 2 is a simplified block diagram associated with using a metadata track for aiding clients in adaptive streaming environments. FIG. 2 includes an encapsulator (also commonly called packager) 50, which further includes an instance of metadata collection 35 that is associated with a number of video streams (Video #1, Video #2, Video #3). In addition, FIG. 2 illustrates a standard HAS client that receives Video #1 and also illustrates an enhanced HAS client 18a that is receiving Video #2, along with a metadata track that is being provided via metadata collection 35. Metadata collection 35 may include quality information that may be associated with any appropriate characteristics that could be of interest to a given client. For example, metadata collection 35 may include information about future segment qualities, future segment sizes, etc. HAS client 18a and encapsulator 50 may include a respective processor 31a-b and a respective memory element 30a-b for facilitating the operations discussed herein.

FIG. 2 also illustrates a set of quality information 45, which could include any suitable information, as discussed herein. In operation of one example flow, quality information 45 may be provided as an input to encapsulator 50 (as is being shown), where this information would be provisioned in the actual metadata track, as it is generated. Once the client begins watching a particular video, it can also begin receiving this particular metadata for the particular video channel. Not only does such a protocol preserve the integrity of the manifest file, it also empowers enhanced clients to receive this quality information (e.g., per-segment) and, thereby, allows the client to use it to improve the user experience.

Note that the adaptive streaming framework, fundamentally, operates on an expected segment size, duration, etc., as the client is consuming video. This would allow, for example, a client to understand how much video it could consume per-second interval. This further allows the client to understand which segment to which it should systematically transition. The underlying heuristics (e.g., associated with how clients adapt to time-varying conditions) should be suitably communicated during streaming activities. Ideally, metadata should be consumed by the client in anticipation of future video data (e.g., two video segments ahead) and, therefore, allow the client to react accordingly. For example, the client could use this metadata to make intelligent decisions concerning rate control (e.g., maintaining a certain quality by shifting to a lower bitstream rate), adaptation logic, etc. This could improve overall throughput, where clients are not consuming unnecessary bits to achieve a certain quality level. Hence, clients could (in the aggregate) consume less bandwidth as a result of this optimization. In certain cases, the system can potentially delay at least a portion of media associated with the video streams, as the corresponding metadata is made available ahead of time, before the video stream is consumed by the client. Again, this would allow the clients to intelligently consume media at a future time interval.

Figure 3A:
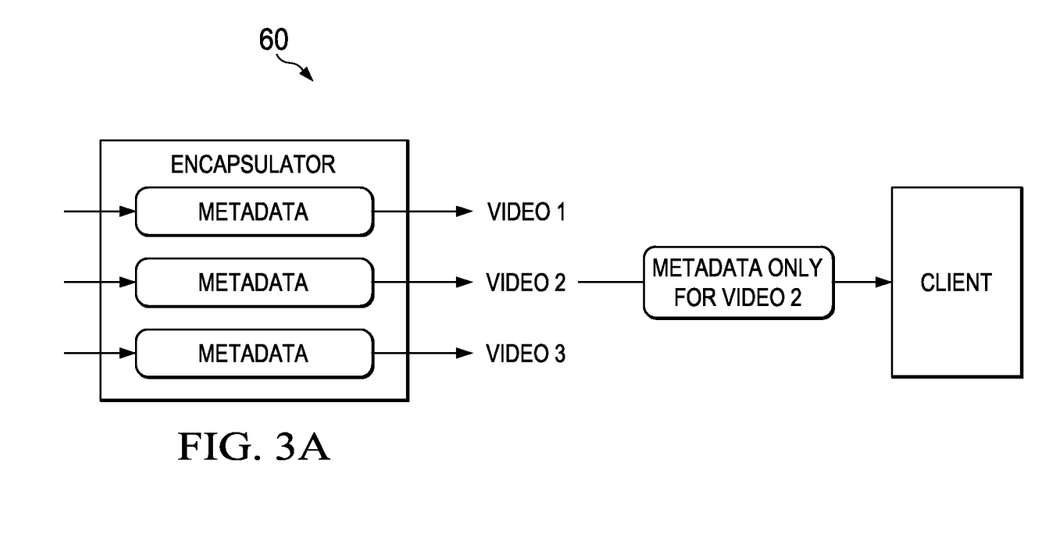
FIGS. 3A-3B are simplified block diagrams illustrating example metadata tools associated with the present disclosure.
Figure 3B:
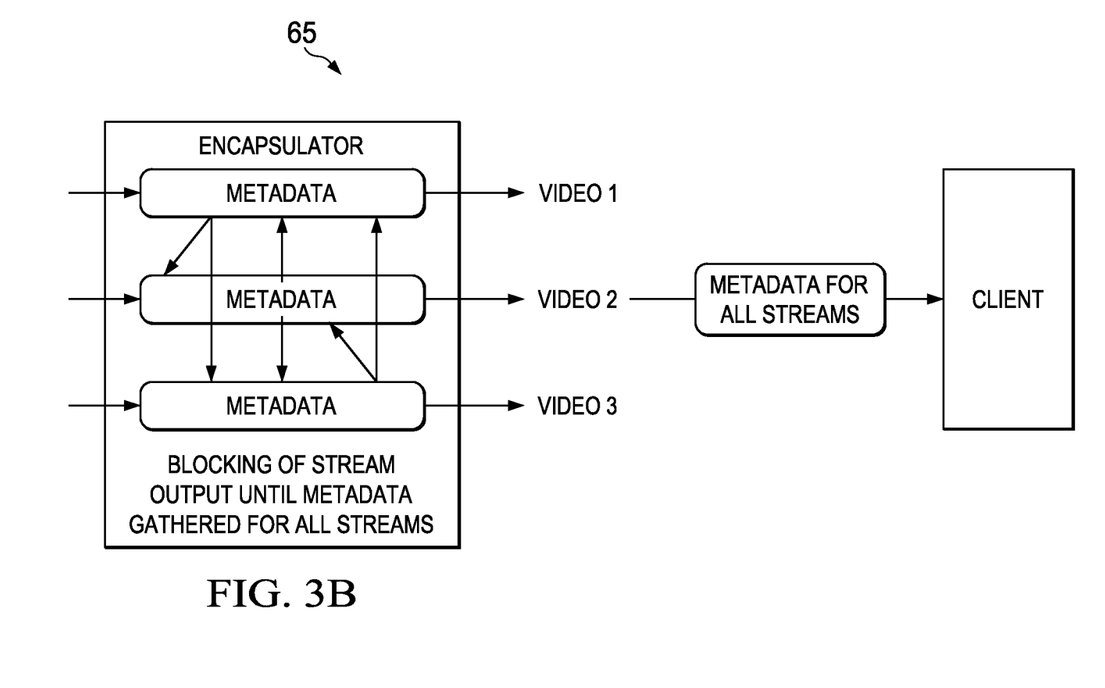

Turning briefly to FIGS. 3A-3B, these illustrations can be used to help explain one or more possible metadata provisioning mechanisms for use in streaming environments. More specifically, FIG. 3A is a simplified schematic diagram 60 illustrating example activity associated with a streaming client that receives video from an encapsulator. Note that a typical streaming client only fetches a single stream. In this particular example of FIG. 3A, metadata can be added to any of these streams (e.g., audio streams or video streams) to offer quality information for any particular stream. Hence, injected into the output of this example is metadata that could be associated with quality information. Obviously, this solution has a number of inherent problems, not the least of which is that all clients are now consuming new and unexpected data for which they may not have been prepared. Hence, one vulnerable assumption in such a model is that the clients would perform without breaking in any way (i.e., that there would be no disruption in the streaming activities on the client side).

FIG. 3B illustrates another simplified schematic diagram 65 associated with the blocking of stream output until metadata is gathered for all streams. Similar to the framework of FIG. 3A, this particular architecture includes an encapsulator, multiple video streams, and a client. In this particular example, within the packager, metadata could be collected and then placed into the output of all the streams. For example, the metadata for Video #1 can be passed to Video #2, Video #3, the metadata for Video #2 can be passed to Video #1, Video #3, and so forth. Each of the clients would then have all metadata for all the streams, irrespective of whether or not the clients would understand this new metadata, be interested in this new metadata, etc. This possible solution suffers from a number of shortcomings. For example, at a minimum, a synchronization algorithm should be employed in order to reconcile any inconsistencies amongst the streams.

Referring back to FIG. 2, FIG. 2 can illustrate how a single metadata track is created by encapsulator 50, which is able to collect metadata for all the streams that are flowing through the packager. In such a case, no video streams would experience an interruption. The metadata that is collected can contain all the metadata for all the streams. The enhanced clients would consume this new metadata track, whereas the standard clients would not consume this new metadata track (and remain fully operational).

In terms of its approach, the system of FIG. 2 cannot arbitrarily define new attributes (or boxes) to publish the metadata because the system seeks to minimize inconsistencies (e.g., reduce the chances of breaking existing frameworks associated with clients, along with maximizing any backwards compatibility with standard clients). Note that even if the system bluntly added the necessary metadata to a new box for the media segment, such information would have to cover all representations, and not simply the representation of a given media segment itself, which could introduce size-related issues. Such an approach would also introduce efficiency problems for a given packager, which would be forced to centralize and serialize the gathering of such metadata prior to publishing a given media fragment.

In contrast to these flawed approaches, the system of the present disclosure can publish essential metadata in a metadata stream, where enhanced clients could simply fetch this information just like any other media stream. This fetching could occur in parallel to the fetching of the audio/video streams. By using a separate metadata track, the system would avoid adding additional overhead to the manifest file or the media fragments. This would ensure that the manifest size remains small and the media segments remain unmodified. Additionally, standard clients that are not capable of benefiting from the additional metadata would not fetch this track and, instead, run their typical decision algorithms. This simplified approach avoids additional hooks that would otherwise be positioned in the manifest file. In one particular implementation, the framework can define the wire format for the metadata track (e.g., similar to segment index boxes). In a simplified example, the architecture can provide size and quality information per-segment in the metadata track.

In operation, a single metadata stream can be used in which an encapsulation component gathers necessary metadata from all video stream representations, and subsequently creates the metadata segments for the streams. This could avoid blocking the regular production of segments for media representations, which would have occurred if the metadata were embedded in the media segments themselves. Alternatively, an adaptation set of discrete metadata streams could be produced to further avoid the need to collectively gather all representation metadata together, prior to metadata segment creation. It should be noted that there is a slight burden on the client in making a multitude of metadata segment requests to discover the quality attributes of the various media representations.

It should also be noted that the encapsulator can modify the metadata track to provide guidance to the client (e.g., based on congestion in the network). This could offer a type of rule management, where the metadata track (after modification) would trigger some specific behavior on the client. For example, the modified metadata track can simply relay to the client that certain resources have become limited and, therefore, the client should adjust its adaptation logic. In a particular case, the modified metadata track could dictate that Video #2 is unavailable to the client for a certain period of time.

Figure 3C:
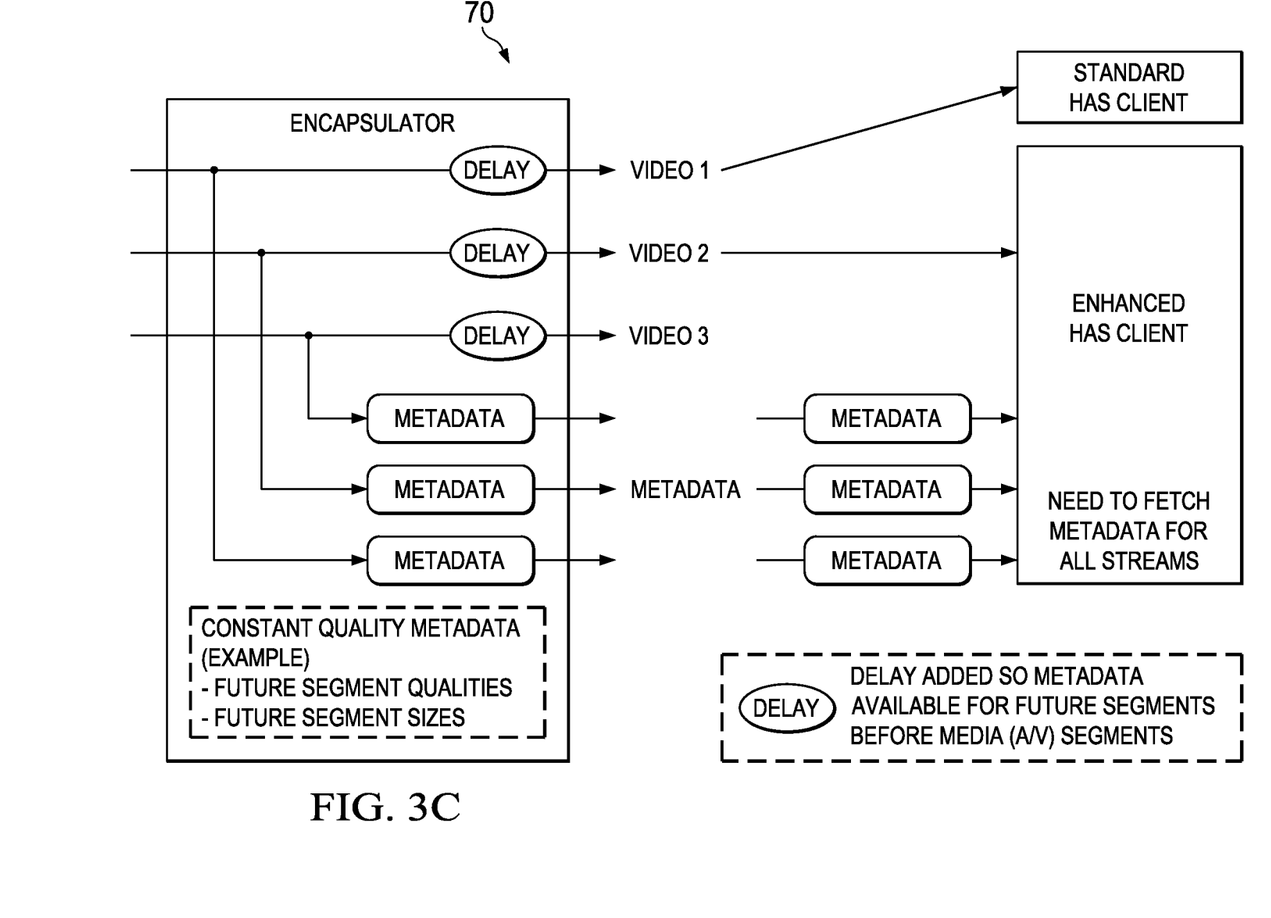
FIG. 3C is a simplified block diagram illustrating a possible alternative embodiment associated with the present disclosure.

FIG. 3C is a simplified schematic diagram 70 illustrating one potential alternative embodiment to the architecture of FIG. 2. More specifically, the example implementation of FIG. 3C reflects the situation in which multiple metadata tracks can be fetched, as opposed to a single metadata track, as shown in FIG. 2. Note that such a solution can involve increased overhead, where the enhanced client would have to fetch all three of these metadata tracks (for Video #1, Video #2, Video #3), as it is consuming video.

Figure 4:
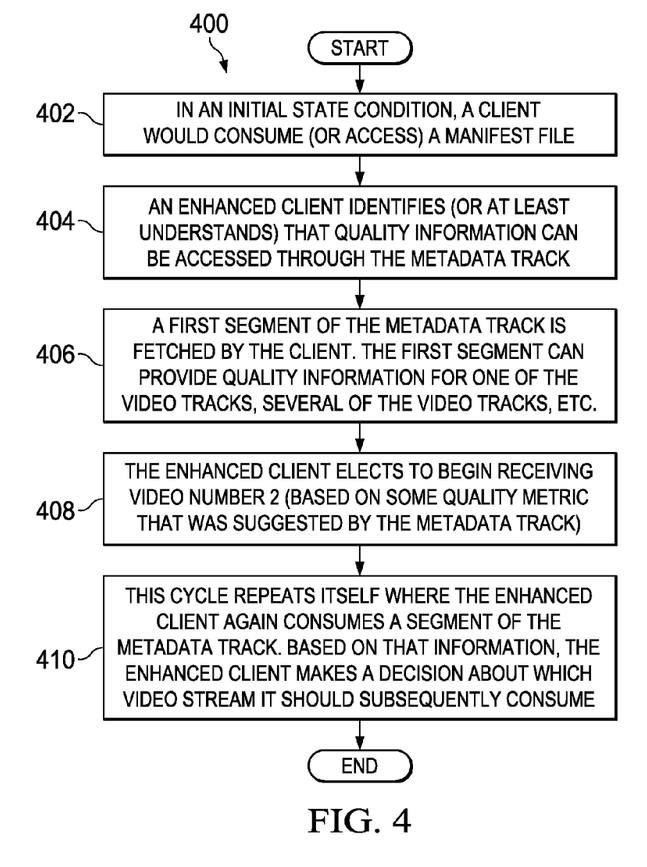
FIG. 4 is a simplified flowchart illustrating potential operations associated with the communication system in accordance with certain embodiments of the present disclosure.

FIG. 4 is a simplified flowchart 400 illustrating one possible set of example activities associated with the present disclosure. In an initial state condition, a client would consume (or access) a manifest file at 402. The actual manifest file could be coming from an origin server, or it could have been cached somewhere in the network. The manifest can include an enumeration of an adaptation set of video profiles (i.e., video streams) available for the client (e.g., Video #1, Video #2, Video #3, etc.). In addition, the manifest file could include any information that would help the client to identify a particular metadata track associated with a particular video stream.

Hence, the manifest file describes to the client the media that is available for access. Stated in different terms, the manifest file can advertise which video tracks are available for access by request from the client. In this particular example, part of this advertising can include advertising the metadata track described herein. A standard client would generally ignore this metadata track.

In 404, an enhanced client identifies (or at least understands) that quality information can be accessed through the metadata track. In certain embodiments, the encapsulator can identify size metrics based on the input stream it receives. The quality metrics could be retrieved upstream (e.g., already provided as part of the stream, provided to the transcoder, or provided further upstream, for example). In certain cases, the encapsulator could perform processing operations in order to produce this quality information itself.

The enhanced client can use the metadata track to enhance its adaptation logic. Note that the term 'enhanced client' simply connotes a client that has the intelligence to identify/ understand the metadata track, or at least anticipate receiving the metadata track. At 406, a first segment of the metadata track is fetched by the client. The first segment can provide quality information for one of the video tracks, several of the video tracks, etc. In this particular example, and for purposes of illustration only, the enhanced client elects to begin receiving Video #2 (based on some quality metric that was suggested by the metadata track) at 408. At 410, this cycle repeats itself where the enhanced client again consumes a segment of the metadata track. Based on that information, the enhanced client makes a decision about which video stream it should subsequently consume. This pattern would repeat itself, as the enhanced client is using the metadata to tell itself which video it should consume. This stands in contrast to common adaptive streaming practice, where adaptation logic is simply based on the existing available bandwidth and available representations but not the metadata. This bandwidth consumption would typically be estimated by the last one or more segments that the client received.

Referring briefly back to certain internal structure that could be used to accomplish the teachings of present disclosure, HAS clients 18a-c can be associated with devices, customers, or end users wishing to receive data or content in communication system 10 via some network. The terms HAS client' and 'client device' are inclusive of any devices used to initiate a communication, such as any type of receiver, a computer, a set-top box, an Internet radio device (IRD), a cell phone, a smartphone, a laptop, a tablet, a personal digital assistant (PDA), a Google Android™, an iPhone™, an iPad™, a Microsoft Surface™, or any other device, component, element, endpoint, or object capable of initiating voice, audio, video, media, or data exchanges within communication system 10. HAS clients 18a-c may also be inclusive of a suitable interface to the human user, such as a display, a keyboard, a touchpad, a remote control, or any other terminal equipment. HAS clients 18a-c may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, audio, or script data, or any type of source or object code, or any other suitable information in any appropriate format that may be communicated from one point to another.

Transcoder 17 (or a multi-bitrate encoder) is a network element configured for performing one or more encoding operations. For example, transcoder 17 can be configured to perform direct digital-to-digital data conversion of one encoding to another (e.g., such as for movie data files or audio files). This is typically done in cases where a target device (or workflow) does not support the format, or has a limited storage capacity that requires a reduced file size. In other cases, transcoder 17 is configured to convert incompatible or obsolete data to a better-supported or more modern format.

Network 16 represents a series of points or nodes of interconnected communication paths for receiving and transmitting packets of information that propagate through communication system 10. Network 16 offers a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. A network can comprise any number of hardware or software elements coupled to (and in communication with) each other through a communications medium.

Encapsulator 50 is a network element that can be used for metadata collection in accordance with the teachings of the present disclosure. Encapsulator 50 can also be referred to as a 'packager' at described herein. Encapsulator 50 may be provisioned within transcoder 17, provided in a Web server, provided in any suitable cache, or provided in any other suitable network element in the network. Encapsulator 50 may receive any suitable input from an upstream or a downstream resource.

In one particular instance, the architecture of the present disclosure can be associated with a service provider digital subscriber line (DSL) deployment. In other examples, the architecture of the present disclosure would be equally applicable to other communication environments, such as an enterprise wide area network (WAN) deployment, cable scenarios, broadband generally, fixed wireless instances, fiber-to-the-x (FTTx), which is a generic term for any broadband network architecture that uses optical fiber in last-mile architectures, and data over cable service interface specification (DOCSIS) cable television (CATV). The architecture can also operate in junction with any 3G/4G/LTE cellular wireless and WiFi/ WiMAX environments. The architecture of the present disclosure may include a configuration capable of transmission control protocol/internet protocol (TCP/IP) communications for the transmission and/or reception of packets in a network.

In more general terms, HAS clients 18a-c, transcoder 17, encapsulator 50, and servers 12a-b are network elements that can facilitate the metadata provisioning activities discussed herein. As used herein in this Specification, the term 'network element' is meant to encompass any of the aforementioned elements, as well as routers, switches, cable boxes, gateways, bridges, load balancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, HAS clients 18a-c, transcoder 17, encapsulator 50, and/or servers 12a-b include software to achieve (or to foster) the metadata provisioning activities discussed herein. This could include the implementation of instances of adaptation logic module 19a-c, metadata collection 35, and/or any other suitable element that would foster the activities discussed herein. Additionally, each of these elements can have an internal structure (e.g., a processor, a memory element, etc.) to facilitate some of the operations described herein. In other embodiments, these metadata provisioning activities may be executed externally to these elements, or included in some other network element to achieve the intended functionality. Alternatively, HAS clients 18a-c, transcoder 17, encapsulator 50, and/or servers 12a-b may include software (or reciprocating software) that can coordinate with other network elements in order to achieve the metadata provisioning activities described herein. In still other embodiments, one or several devices may include any suitable algorithms, hardware, software, components, modules, interfaces, or objects that facilitate the operations thereof.

In certain embodiments, the metadata provisioning techniques of the present disclosure can be incorporated into a proxy server, Web proxy, cache, content delivery network (CDN), etc. This could involve, for example, instances of adaptation logic module 19a-c, metadata collection 35, etc. being provisioned in these elements. Alternatively, simple messaging or signaling can be exchanged between an HAS client and these elements in order to carry out the activities discussed herein. In operation, a CDN can provide bandwidth-efficient delivery of content to HAS clients 18a-c or other endpoints, including set-top boxes, personal computers, game consoles, smartphones, tablet devices, iPads™ iPhones™, Google Droids™, Microsoft Surfaces™, customer premises equipment, or any other suitable endpoint. Note that servers 12a-b (previously identified in FIG. 1) may also be integrated with or coupled to an edge cache, gateway, CDN, or any other network element. In certain embodiments, servers 12a-b may be integrated with customer premises equipment (CPE), such as a residential gateway (RG).

As identified previously, a network element can include software (e.g., adaptation logic module 19a-c, metadata collection 35, etc.) to achieve the metadata provisioning operations, as outlined herein in this document. In certain example implementations, the metadata provisioning functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by a processor [processors shown in FIG. 2], or other similar machine, etc.). In some of these instances, a memory element [memories shown in FIG. 2] can store data used for the operations described herein. This includes the memory element being able to store instructions (e.g., software, code, etc.) that are executed to carry out the activities described in this Specification. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the metadata provisioning activities, as outlined herein. Additionally, each of these devices may include a processor that can execute software or an algorithm to perform the metadata provisioning activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that while the preceding descriptions have addressed certain streaming management techniques, it is imperative to note that the present disclosure can be applicable to various protocols and technologies (e.g., Microsoft Smooth™ Streaming (HSS™), Apple HTTP Live Streaming (HLS™), Adobe Zeri™ (HDS), etc.). In addition, one application that could be used in conjunction with the present disclosure is DASH, which is a multimedia streaming technology that could readily benefit from the techniques of the present disclosure. DASH is an adaptive streaming technology, where a multimedia file is partitioned into one or more segments and delivered to a client typically using HTTP. A media presentation description (MPD) can be used to describe segment information (e.g., timing, URL, media characteristics such as video resolution and bitrates). Segments can contain any media data and could be rather large. DASH is codec agnostic. One or more representations (i.e., versions at different resolutions or bitrates) of multimedia files are typically available, and selection can be made based on network conditions, device capabilities, and user preferences to effectively enable adaptive streaming. In these cases, communication system 10 could perform appropriate metadata provisioning based on the individual needs of clients, servers, etc.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its techniques) are readily scalable and, further, can accommodate a large number of components, as well as more complicated/sophisticated arrangements and configurations. Accordingly, the examples provided should not limit the scope or inhibit the broad techniques of communication system 10, as potentially applied to a myriad of other architectures.

It is also important to note that the steps in the preceding FIGURES illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving media from an input;
   gathering metadata from a plurality of media stream representations that are provided by the input;
   creating one or more metadata segments, wherein each of the metadata segments corresponds to one of the plurality of media stream representations;
   combining the metadata segments into an independently fetchable metadata track;
   advertising the metadata track in a manifest file provided to a client device; and
   making at least a portion of the metadata track available to the client device, wherein the portion of the metadata track is provided separate from the manifest file,
   wherein the metadata track comprises per-segment size and quality information for each of the media stream representations for use by the client device in selecting one of the media stream representations.

2. The method of claim 1, wherein the metadata track is provided in a system cache or a Web server.

3. The method of claim 1, further comprising:
   delaying at least a portion of media to be consumed by the client device, as particular metadata of the metadata track is made available to the client device.

4. The method of claim 1, wherein the manifest file includes information to be used by the client device to identify particular metadata for a particular media stream.

5. The method of claim 1, wherein an encapsulator is used to generate the manifest file and to generate the metadata track.

6. The method of claim 1, further comprising:
   modifying the metadata track to provide guidance to the client device to trigger a behavior from the client device.

7. The method of claim 1, wherein an encapsulator modifies the metadata track to relay to the client device that certain network resources have become limited or available.

8. The method of claim 1, wherein an encapsulator modifies the metadata track in order to indicate to the client device that a particular media stream is unavailable for a certain period of time.

9. The method of claim 1, wherein an encapsulator can identify size metrics associated with a plurality of media stream representations based on the input it receives.

10. The method of claim 1, wherein quality information may be provided as part of the input, and wherein at least a portion of the quality information is provided in the metadata track.

11. The method of claim 1, wherein fetching activities associated with the metadata track occurs in a substantially parallel fashion to fetching activities associated with accessing one or more media segments associated with a particular media stream.

12. The method of claim 1, wherein the manifest file includes an enumeration of an adaptation set of media profiles available to the client device, and wherein the adaptation set of media profiles are associated with particular media streams being received at an encapsulator.

13. The method of claim 1, wherein multiple metadata tracks are made available for access by the client device, and wherein the multiple metadata tracks correspond to multiple media streams.

14. One or more non-transitory tangible media that includes code for execution and when executed by a processor operable to perform operations comprising:
   receiving media from an input;
   gathering metadata from a plurality of media stream representations that are provided by the input;
   creating one or more metadata segments, wherein each of the metadata segments corresponds to one of the plurality of media stream representations;
   combining the metadata segments into an independently fetchable metadata track;
   advertising the metadata track in a manifest file provided to a client device; and
   making at least a portion of the metadata track available to the client device, wherein the portion of the metadata track is provided separate from the manifest file,
   wherein the metadata track comprises per-segment size and quality information for each of the media stream representations for use by the client device in selecting one of the media stream representations.

15. The non-transitory tangible media of claim 14, wherein the metadata track is provided in a system cache or a Web server.

16. The non-transitory tangible media of claim 14, the operations further comprising:
   delaying at least a portion of media to be consumed by the client device, as particular metadata of the metadata track is made available to the client device.

17. The non-transitory tangible media of claim 14, wherein the manifest file includes information to be used by the client device to identify particular metadata for a particular media stream.

18. The non-transitory tangible media of claim 14, the operations further comprising:
modifying the metadata track to provide guidance to the client device to trigger a behavior from the client device.

19. A network element, comprising:
a processor; and
a memory, wherein the network element is configured to:
receive media from an input;
gather metadata from a plurality of media stream representations that are provided by the input;
create one or more metadata segments, wherein each of the metadata segments corresponds to one of the plurality of media stream representations;
combine the metadata segments into an independently fetchable metadata track;
advertise the metadata track in a manifest file provided to a client device; and
make at least a portion of the metadata track available to the client device, wherein the portion of the metadata track is provided separate from the manifest file,
wherein the metadata track comprises per-segment size and quality information for each of the media stream representations for use by the client device in selecting one of the media stream representations.

20. The network element of claim 19, wherein the network element is further configured to:
delay at least a portion of media to be consumed by the client device, as particular metadata of the metadata track is made available to the client device.

\* \* \* \* \*